United States Patent [19]
Wolff et al.

[11] Patent Number: 5,241,809
[45] Date of Patent: Sep. 7, 1993

[54] CUTTING MACHINE WITH A PIVOTING HITCHING STRUCTURE

[75] Inventors: Michel Wolff, Waltenheim s/Zorn; Horst Neuerburg, Saverne, both of France

[73] Assignee: Kuhn S.A., Saverne Cedex, France

[21] Appl. No.: 870,593

[22] Filed: Apr. 17, 1992

[30] Foreign Application Priority Data

Apr. 30, 1991 [FR] France ............... 91 05560

[51] Int. Cl.⁵ .................. A01D 34/66; A01D 34/06
[52] U.S. Cl. ................. 56/16.2; 56/DIG. 10
[58] Field of Search ............ 56/16.2, 15.9, 16.3, 56/DIG. 10, 6, 7, 15.2, 228

[56] References Cited

U.S. PATENT DOCUMENTS

| | | | |
|---|---|---|---|
| 2,767,539 | 10/1956 | Huddle | 56/16.2 X |
| 2,823,506 | 2/1958 | Irving | 56/16.2 |
| 3,400,522 | 9/1968 | Scarnato et al. | 56/16.2 X |
| 3,791,115 | 2/1974 | Nelsen et al. | 56/16.2 X |
| 4,557,104 | 12/1985 | Toillie et al. | 56/13.6 |
| 4,720,964 | 1/1988 | Ermacora et al. | 56/13.6 |
| 4,730,445 | 3/1988 | Wolff | 56/13.6 |
| 4,761,940 | 8/1988 | Wolff | 56/13.6 |
| 4,763,463 | 8/1988 | Ermacora et al. | 56/13.6 |
| 4,809,488 | 3/1989 | Neuerburg et al. | 56/13.6 |
| 4,833,868 | 5/1989 | Ermacora et al. | 56/13.6 |
| 4,879,870 | 11/1989 | Neuerburg | 56/13.6 |
| 4,896,493 | 1/1990 | Neuerburg | 56/255 |
| 4,909,023 | 3/1990 | Haberkorn et al. | 56/13.6 |
| 4,922,693 | 5/1990 | Neuerburg | 56/13.6 |
| 4,947,629 | 8/1990 | Ermacora et al. | 56/13.6 |
| 4,970,848 | 11/1990 | Neuerburg et al. | 56/10.4 |
| 4,999,981 | 3/1991 | Neuerburg | 56/6 |
| 5,101,616 | 4/1992 | Wolff | 56/15.2 |

FOREIGN PATENT DOCUMENTS

| | | |
|---|---|---|
| 0337909 | 10/1989 | European Pat. Off. |
| 0356358 | 2/1990 | European Pat. Off. |
| 0422721 | 4/1991 | European Pat. Off. |
| 2723060 | 11/1978 | Fed. Rep. of Germany |
| 2437767 | 4/1980 | France |
| 6918351 | 6/1971 | Netherlands |
| 7115956 | 5/1973 | Netherlands |
| 1119644 | 7/1968 | United Kingdom |
| 2157936 | 11/1985 | United Kingdom |
| 8803749 | 6/1988 | World Int. Prop. O. |

*Primary Examiner*—Stephen J. Novosad
*Attorney, Agent, or Firm*—Oblon, Spivak, McClelland, Maier & Neustadt

[57] ABSTRACT

A cutting machine (1) intended to be coupled to a motor vehicle (2) includes a draw spring (59) and a locking element (28) to lock the pivoting of a support beam (5) relative to a hitching structure (4) around an axis (11A) of a first journal (11) during transport, and whose action is cancelled during work and set down.

29 Claims, 7 Drawing Sheets

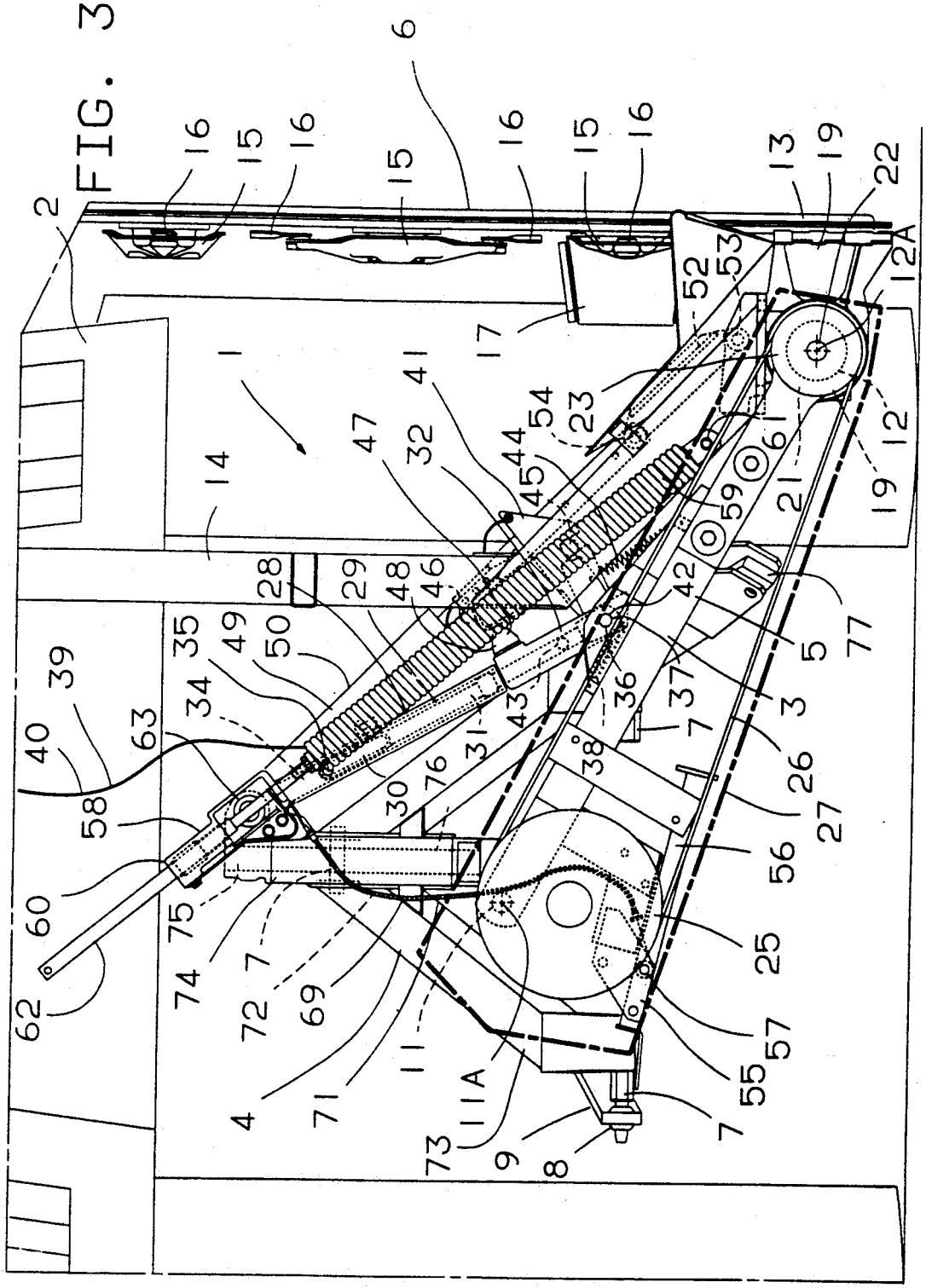

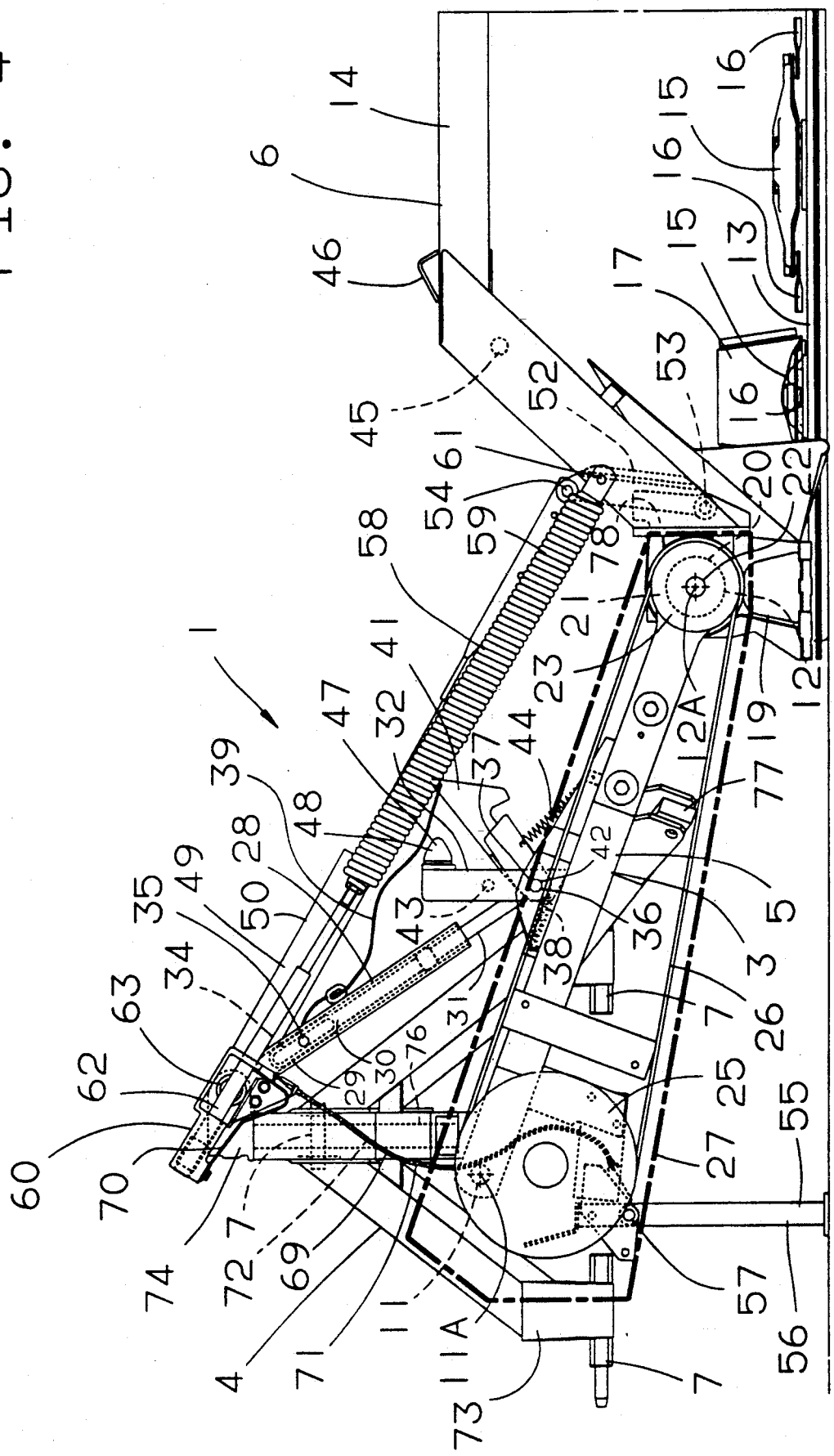

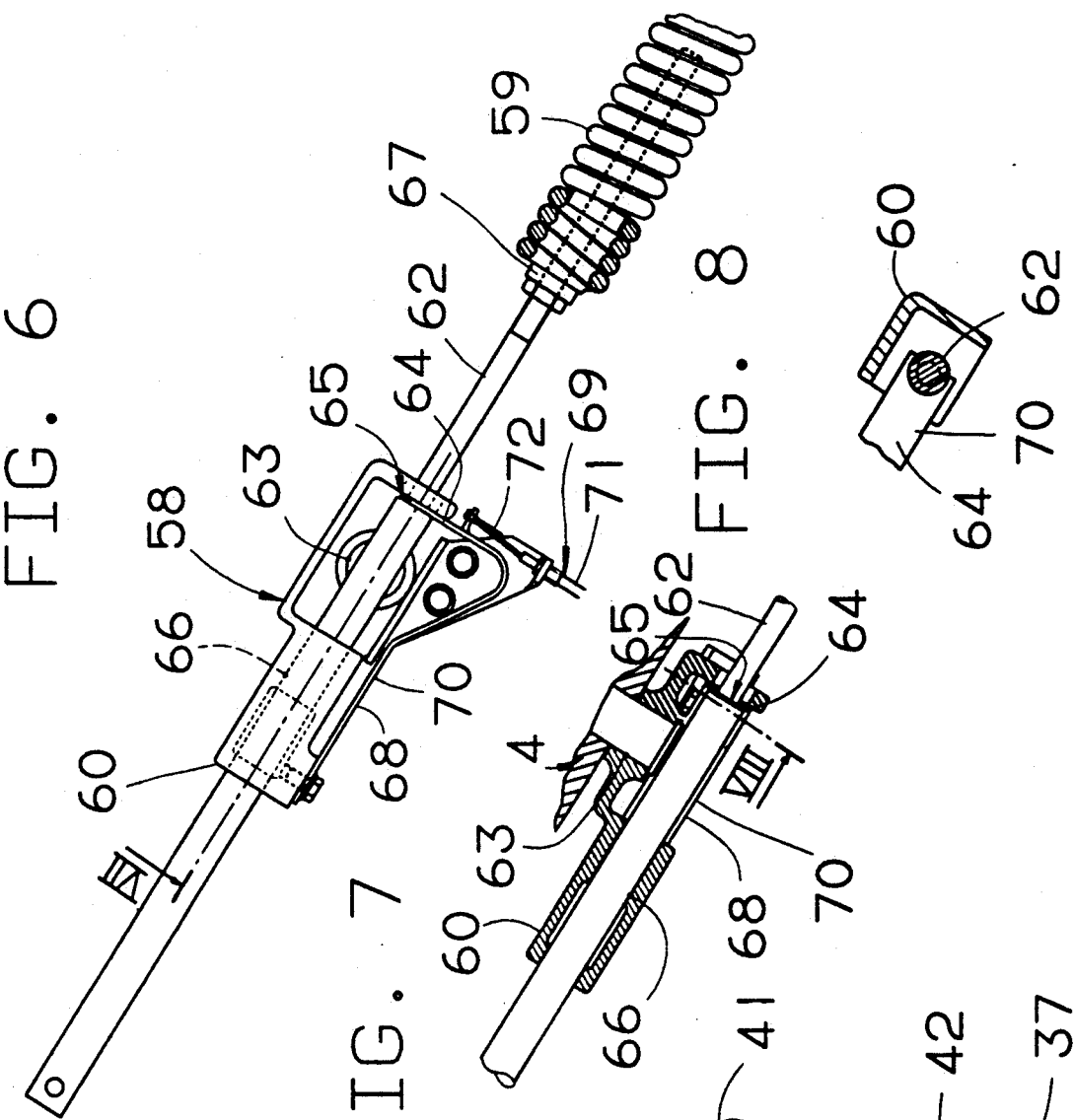

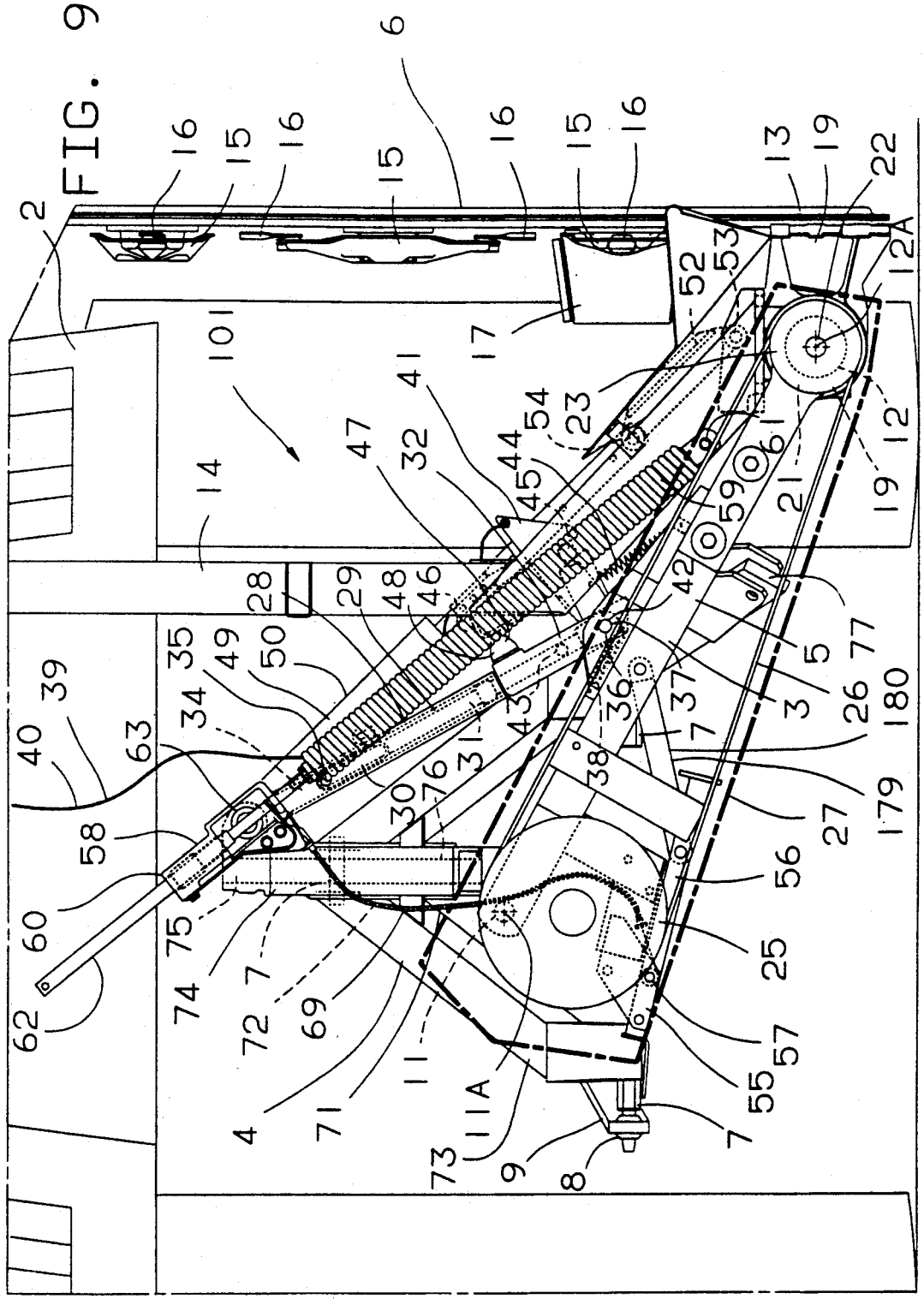

CUTTING MACHINE WITH A PIVOTING HITCHING STRUCTURE

BACKGROUND OF THE INVENTION

1. Field of the Invention

This invention relates to a cutting machine.

2. Description of the Related Art

A known mower of this type has a traction element which extends between the hitching structure and the support beam. This traction element comprises a pipe, provided at its longitudinal end opposite the hitching structure with slot extending in the direction of said pipe. A pin, attached to the hitching structure, goes through the slot which allows a relative movement of the traction element relative to said pin over a length equal to that of the slot.

The traction element also has a tie rod slidably mounted in the pipe and whose free end is connected to the support beam by a retaining pin. The latter extends parallel to the direction of work and can be pivoted around its geometric axis.

The guiding of the tie rod relative to the pipe is provided by two centering rods lengthening said pipe. A disk integral with the tie rod has two holes for the passage of the centering rods. Moreover, between the disk and a ring carried by the free ends of the centering rods extends a compression spring whose force tends to separate the disk from the ring. By so doing, the compression ring tends, during work, to reduce the length of the traction element and to lighten the cutting mechanism.

To cancel the action of the traction element for setting down of the mower, it is provided that the end of the tie rod which is inside the pipe just abuts against a pin put in place by the user for this purpose. In this way, when this known mower is to be set down, it is advantageously possible to pivot the hitching structure relative to the support beam around the axis of the first journal within the limits allowed by the slot. This substantially facilitates the hitching of the mower to a tractor.

Nevertheless, this known mower exhibits some drawbacks.

First, to lighten the cutting mechanism correctly during its displacements in height, the prestressing length of the compression spring must be relatively large, therefore its offload length must also be large.

Moreover, taking into account the extent of the prestressing necessary for a sufficient lightening of the cutting mechanism, it is not very easy to remove the compression spring, in particular following the breaking of a coil of the spring.

An additional drawback of this known mower appears during transport, where the support beam pivots relative to the hitching structure around the axis of the first journal under the effect of the contour of the ground combined with the actions of the spring and the weight of the cutting mechanism, resulting in a continual swinging of the cutting mechanism.

SUMMARY OF THE INVENTION

An object of this invention is, while maintaining a certain ease of hitching, to create a cutting machine which is more easily transportable and whose spring does not contribute to the above shortcomings.

For this purpose, a locking element is provided according to the invention to lock the pivot position of the support beam relative to the hitching structure around the axis of the first journal during transport, and whose action is cancelled during work and set down of the mower. In addition, the spring according to the invention is a draw spring.

Due to this locking element, it is possible to immobilize the support beam relative to the hitching structure and therefore to reduce considerably the swinging of the cutting mechanism during transport. Further, compared with a compression spring, an equivalent draw spring has an offload length that is smaller and can be exchanged more easily.

According to an additional characteristic of the invention, the draw spring is expanded when its action is cancelled and the traction element which comprises the draw spring extends between the hitching structure and the cutting mechanism. Such an arrangement further facilitates the replacement of the draw spring, while eliminating any risks of accidental releasing of said draw spring in the set down position. Moreover, since the traction element extends between the hitching structure and the cutting mechanism, the latter is further lightened, in particular when it has a large work width.

According to another characteristic of the invention, the action of the draw spring is cancelled by a control device. For example, the draw spring can be connected at one of its ends to the cutting mechanism by a pivot connection with an axis at least approximately parallel to the axis of the second journal and at the other of its ends to the control device by a tie rod having an axis at least approximately coaxial with the longitudinal axis of the draw spring. On the other hand, the control device is connected to the hitching structure with a pivot connection with an axis at least approximately parallel to the axis of the first journal.

In such an embodiment, the tie rod can further be equipped with a shoulder intended to rest against a retractable stop of the control device. The stop can occupy two positions: a work position in which the shoulder of the tie rod rests against the stop, which makes it possible for the draw spring to lighten the cutting mechanism; and a set down position in which the stop is retracted and where the cutting mechanism rests longitudinally on the ground. Holding the stop in its work position can be performed by a spring.

Further, the stop and the spring can advantageously be combined in a leaf spring whose free end, intended to cooperate with the shoulder of the tie rod, has the shape of a fork.

According to an additional characteristic of the invention, the control device is actuated by a remote control element. It is therefore optionally possible to actuate the control device from a motor vehicle.

According to another characteristic of the invention, a set down element is connected to the first journal or to the support beam in the vicinity of said first journal so as to be able to occupy two positions: a work position in which the set down element is retracted and a set down position in which the set down element can rest on the ground to support the support beam.

The passage of the set down element from its work position to its set down position, and conversely, can be achieved with a maneuvering means. Advantageously, the maneuvering means can be a cylinder controlled from the motor vehicle.

In a particularly advantageous embodiment, the remote control element of the control device is actuated together with the set down element so that when the set down element is in its work position, the draw spring can lighten the cutting mechanism and when in its set down position, the action of the draw spring is cancelled. It is thus possible to control, simultaneously and from a single maneuvering means, the control device and the set down element.

The remote control element can comprise a housing inside of which can be translated a cable connected directly or indirectly to the set down element and to the control device.

According to another characteristic of the invention, the locking element comprises: a limiter of variable length, connected at one of its longitudinal ends to the hitching structure by a joint and at the other of its longitudinal ends to the support beam by another joint, each of said joints having at least one axis substantially parallel to the axis of the first journal; and a lock intended to lock the length of the limiter during transport.

In a particularly advantageous embodiment, the limiter comprises a pipe connected to the hitching structure and a rod connected, at one of its longitudinal ends, to the support beam, while at the other of its ends, the rod comprises a slot extending inside the pipe and through which passes a pin attached to said pipe. Further, in this particularly advantageous embodiment, the lock is connected to the support beam by a pivot connection with an axis at least approximately coaxial with the joint the axis connecting the rod of the limiter to the support beam, so that said lock can occupy two positions by pivoting around the axis of said pivot connection. The two positions are a position for work and for setting down in which the limiter is extended so as to limit the pivoting of the support beam relative to the hitching structure around the axis of the first journal, and a transport position in which the limiter is locked by the lock in an open position, i.e., when its length is greatest.

The setting of the lock into the unlocked position for work and for setting down can be performed by a spring.

A remote control element can make it possible to bring the lock into, and to hold it directly or indirectly in, the locked transport position. Advantageously, this remote control element can be a small rope intended to be handled from the motor vehicle.

According to an additional characteristic of the invention, the cutting mechanism is brought into a raised transport position by pivoting around the axis of the second journal with a maneuvering element.

In an advantageous embodiment, the maneuvering element can be a cylinder connected at one of its longitudinal ends to the cutting mechanism by a pivoting lever and at the other of its longitudinal ends to the hitching structure with a joint having at least one axis at least approximately parallel to the axis of the first journal.

The cutting mechanism comprises a holding element holding the lock of the limiter in its locking position when the cutting mechanism is in a raised transport position.

Further, there is positioned between the holding element and the lock an elastically deformable element which helps to begin the downward movement of the cutting mechanism. This elastically deformable element can be a rubber stop attached to the lock.

According to another particularly advantageous characteristic, the cutting machine can further comprise a locking means intended to lock the cutting mechanism in its transport position. The unlocking of the cutting mechanism can be performed by a remote control element acting on the locking means.

In the embodiments where the cutting mechanism can be brought into raised transport position, the locking means is a catch connected to the support beam by a pivot connection with an axis at least approximately parallel to the axis of the second journal and intended to be hooked to a latch element of the cutting mechanism. The displacement and the holding of the catch in its locked position can be performed with a spring.

According to a very advantageous characteristic, the axis of the first journal, seen in the direction of advance during work, extends at least approximately at the center of a triangle defined by the three hitching points of the hitching structure.

In addition, the hitching structure of the cutting machine according to the invention can comprise a frame equipped with three hitching points and a connection device connecting said frame to the first journal, so that the connection device can allow, if necessary, a pivoting of the first journal relative to the frame around a geometric axis directed upward. For example, the connection device can comprise a journal connected at its lower end to the first journal and connected to the frame with a pivot connection with geometric axis at least approximately vertical.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows, in transport position, the mower of FIG. 1, seen from the rear in the direction of advance during work;

FIG. 4 shows, in set down position, the mower of FIG. 1, seen from the rear in the direction of advance during work;

FIG. 5 shows, on an enlarged scale, a rear view in the direction of advance during work of the locking element and the catch intended to lock the cutting mechanism in its raised transport position, when the user acts on the small rope of the catch;

FIG. 6 shows, on an enlarged scale, a view of the control device and a part of the draw spring;

FIG. 7 shows a section of the control device along plane VII—VII defined in FIG. 6;

FIG. 8 shows a section of the control device along plane VIII—VIII defined in FIG. 7;

FIG. 9 shows, in transport position, another example of a mower according to the invention seen from the rear in the direction of advance during work and connected to a motor vehicle.

DETAILED DESCRIPTION OF THE PREFERRED EMBODIMENTS

Figure 1:
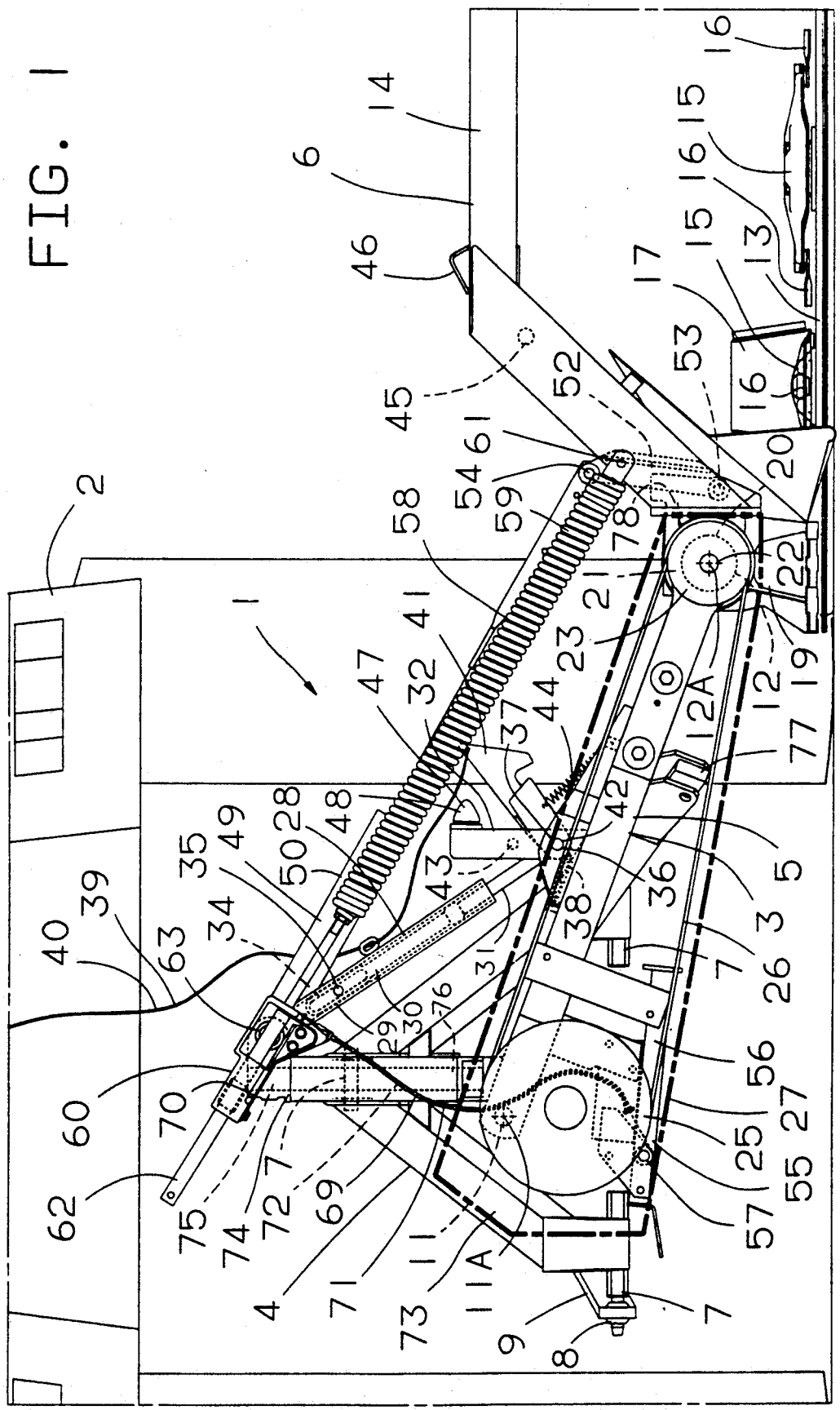
FIG. 1 shows, in work position, a mower according to the invention seen from the rear in the direction of advance during work and connected to a motor vehicle.

In FIGS. 1 to 8, a mower (1) according to the invention is hitched to a farm tractor (2). This mower (1)

consists mainly of a frame (3), having a hitching structure (4) and a support beam (5), and a cutting mechanism (6).

Hitching structure (4) is equipped, at its front part, with three hitching points (7) intended to be connected to three hitching points (8) of lifting device (9) of farm tractor (2). Support beam (5) extends, in top view, during work, crosswise to direction of work (10) and at least approximately at the same level as hitching structure (4). At one of its longitudinal ends, support beam (5) is connected to hitching structure (4) by a first journal (11) with geometric axis (11A) directed in the direction of advance and extending, as seen in direction of advance (10) during work, at least approximately in the vicinity of the center of the triangle defined by the three hitching points (7) of hitching structure (4). At its other longitudinal end, support beam (5) of frame (3) is connected to a longitudinal end of cutting mechanism (6) by a second journal (12) with geometric axis (12A) directed in the direction of advance. Due to such a frame, cutting mechanism (6) can, during work, extend beside the path of tractor (2) and adapt easily to the contour of the ground.

Cutting mechanism (6) comprises a cutting bar (13) surmounted by a carrying structure (14). As seen in FIGS. 1 to 4, cutting bar (13) is equipped with multiple disks (15) equipped on their periphery with cutting tools (16). During work, these disks (15) rotate around geometric axes directed upward. Moreover, in a manner known to one skilled in the art, these disks (15) which are at a longitudinal end of cutting bar (13) are surmounted by a drum (17) rotating around the same geometric axis as the disk (15) that it surmounts. These two drums (17) grade the windrow of product cut by cutting tools (16).

Figure 2:
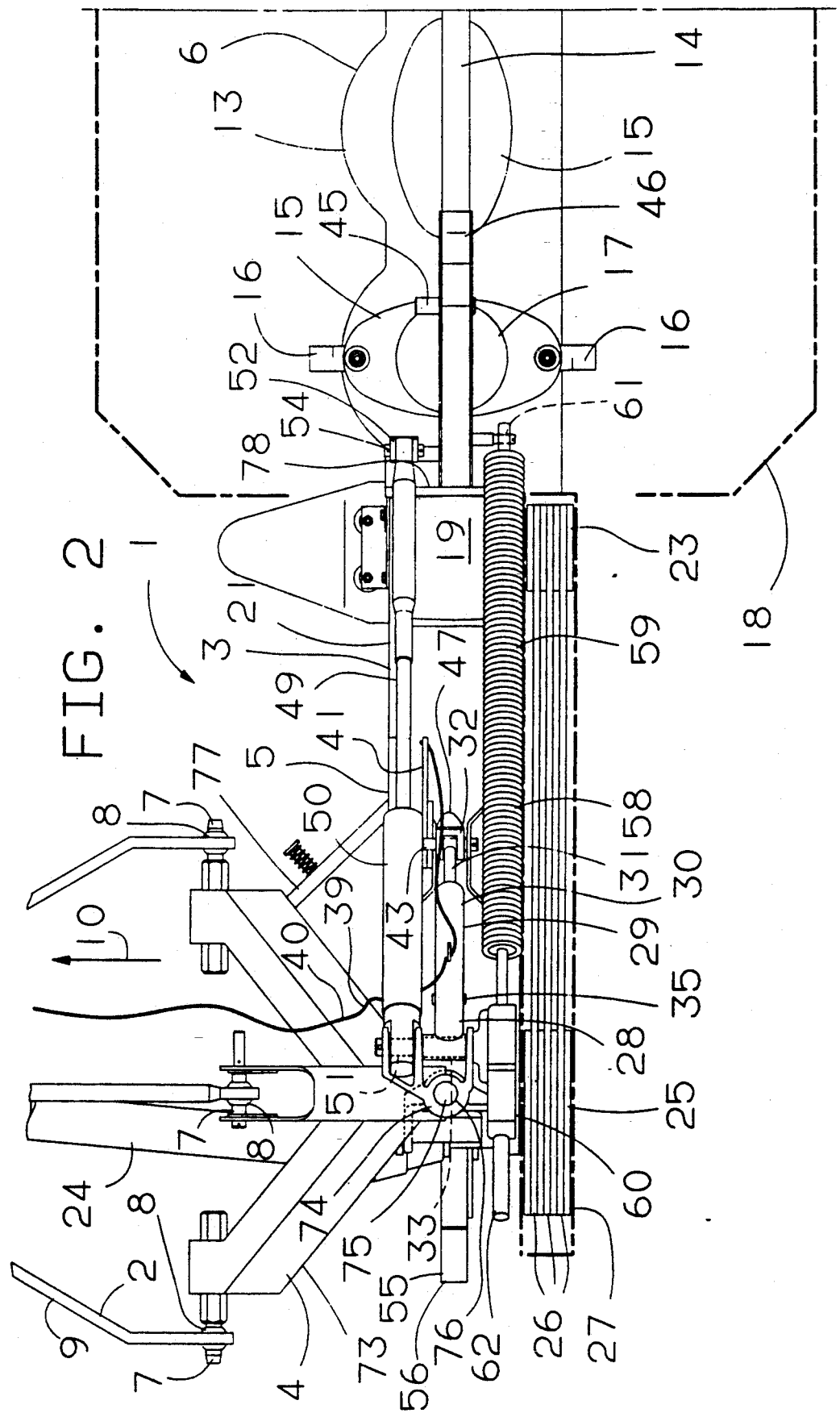
FIG. 2 shows a top view of the mower of FIG. 1, still in work position.

Carrying structure (14), which surmounts cutting bar (13), is intended to support protection elements (18) (shown in chain lines in FIG. 2). This carrying structure (14) is attached to cutting bar (13) by a transmission housing (19) The latter performs a dual function: it connects cutting mechanism (6) to support beam (5), and it also contains a part of the drive elements for driving disks (15) and drums (17).

Transmission housing (19) is actually equipped with two cylindrical bearing surfaces (20) forming the second journal (12) and able to rotate in the flanges of a yoke (21) integral with support beam (5). These cylindrical bearing surfaces (20) are, in a manner known to one skilled in the art, made in the form of bearings in which is rotatably guided an input shaft (22) whose axis of rotation is coaxial with geometric axis (12A) of second journal (12). By this input shaft (22), disks (15) and drums (17) of cutting bar (13) are driven in rotation.

To the rear, input shaft (22) extends beyond transmission housing (19) and is rotatably connected with a pulley (23). This pulley (23) is part of the transmission elements of mower (1) which transmit the movement from the power takeoff (not represented) of tractor (2) to input shaft (22) of transmission housing (19). These transmission elements further comprise a drive shaft with universal joints (24) (FIG. 2), a pulley (25) and belts (26). Drive shaft (24) is connected in rotation with pulley (25) connected to support beam (5) and having an axis of rotation directed substantially in the direction of advance (10) during work when mower (1) is in mowing position (FIGS. 1 and 2). The transmission of the movement from pulley (25) to pulley (23) is provided by belts (26) which are wound on said pulleys (23, 25). A protective hood (27) (shown in chain lines) partially surrounds pulleys (23, 25) and belts (26).

As can be seen in FIGS. 1 to 5, frame (3) of this mower (1) according to the invention is equipped with a locking element (28) for locking the position of support beam (5) relative to hitching structure (4) around geometric axis (11A) of first journal (11). This locking element (28) consists of a limiter (29) comprising a pipe (30) and a rod (31), and a lock (32) (FIG. 5).

Pipe (30) is connected at one of its longitudinal ends to the upper part of hitching structure (4) by a joint (33) having a geometric axis substantially parallel to geometric axis (11A) of first journal (11). Inside this pipe (30) slides a part of rod (31) provided with a slot (34) and having a longitudinal axis substantially coaxial with the longitudinal axis of said pipe (30). A pin (35) attached to pipe (30) goes through slot (34), thus limiting the translation of rod (31) in pipe (30). The longitudinal end of the other part of rod (31), which extends outside pipe (30), is connected to the median part of support beam (5) via a joint (36) having, like joint (33), a geometric axis substantially parallel to geometric axis (11A) of first journal (11). As a result, limiter (29) limits the pivoting of support beam (5) relative to hitching structure (4) around geometric axis (11A) of first journal (11), and so the downward movement of second journal (12) which connects cutting mechanism (6) to support beam (5). The user can therefore, for transport, for example, actuate lifting device (9) of tractor (2), to fully contract the limiter (29) and to lift cutting mechanism (6).

In this "windrow"-type position, limiter (29) can be locked by lock (32). For this purpose, lock (32) is connected to support beam (5) by a pivot connection (37) with a geometric axis substantially coaxial with the geometric axis of joint (36) connecting rod (31) of limiter (29) to the support beam (5). The lock (32) can be pivoted around said geometric axis from an unlocked position (for example that of FIG. 1) in which rod (31) is permitted to slide inside pipe (30) to a locking position in which lock (32) covers the part of rod (31) which extends outside pipe (30) and prevents the movement of the rod (31) in the pipe (30). In this latter position, lock (32) prevents any translation of rod (31) inside pipe (30), so that locking element (28) is locked and prevents rotation of support beam (5).

The lock (32) is normally biased into an unlocked position by the action of a spring (38) extending between support beam (5) and lock (32). Conversely, a remote control element (39) makes it possible for the user to bring lock (32) into, and to hold it at least temporarily in, the locking position.

As shown in FIGS. 1 to 5, remote control element (39) is a small rope (40), intended to be handled by the user from tractor (2) and connected to a catch (41) able to pivot lock (32) into its locking position. Lock (32) includes a pin (43) which catch (41) engages to pivot said lock (32) into its locked position (illustrated in FIG. 5) when the user pulls on small rope (40). For this purpose, catch (41) is connected to support beam (5) via a pivot connection (42) with a geometric axis substantially coaxial with the geometric axis of pivot connection (37) of lock (32). The user can therefore, when mower (1) is in windrow position, lock limiter (29) by pulling on small rope (40).

As soon as the user stops pulling on small rope (40), catch (41) pivots toward its initial position under the action of a spring (44) (FIG. 1) attached to support beam (5). Advantageously, catch (41) makes it possible, in addition, to lock cutting mechanism (6), when the latter is brought into a raised transport position (FIG. 3) by pivoting around geometric axis (12A) of second journal (12). As can be seen in FIG. 3, carrying structure (14) of cutting mechanism (6) includes a latching element (45) to which catch (41) is hooked when small rope (40) is released and catch (41) rotates under the force of the spring (44). It thus is possible to lock cutting mechanism (6) in its raised transport position. The unlocking of cutting mechanism (6) is performed by pivoting catch (41) against spring (44) by small rope (40).

In FIG. 3, it is also seen that lock (32) is held in its locked position by a holding element (46). The latter is attached to carrying structure (14) of cutting mechanism (6) and holds lock (32) in its locked position when cutting mechanism (6) is in a raised position. As a result, as soon as cutting mechanism (6) is lifted, locking element (28) is automatically locked, which prevents the pivoting of support beam (5) relative to hitching structure (4) around geometric axis (11A) of first journal (11).

Further, lock (32) of locking element (28) is surmounted by an elastically deformable element (47) which is made in the form of a rubber stop (48). When cutting mechanism (6) is fully in the transport position, holding element (46) of said cutting mechanism (6) slightly compresses this stop (48) so that the latter, during the displacement of cutting mechanism (6) from the transport position to the windrow position, acts as a spring to begin this movement.

Conversely, the passage of cutting mechanism (6) from the windrow position, where it extends at least approximately horizontally above the ground, into the raised transport position is performed by a maneuvering element (49). In this embodiment, this maneuvering element (49) consists of a single-action hydraulic cylinder (50). This hydraulic cylinder (50) is connected at one of its longitudinal ends to hitching structure (4) by a joint (51) (FIG. 2) and at the other of its longitudinal ends to carrying structure (14) of cutting mechanism (6) by a pivoting lever (52). The latter is connected to carrying structure (14) of cutting mechanism (6) by a pin (53) and to hydraulic cylinder (50) by an additional pin (54). Moreover, joint (51) connecting hydraulic cylinder (50) to hitching structure (4) and joint (33) connecting pipe (30) of locking element (28) to said hitching structure (4) are substantially coaxial.

During the setting down of this mower (1) (FIG. 4), cutting mechanism (6) rests longitudinally on the ground and support beam (5) is supported by a set down element (55). In this embodiment, set down element (55) is a prop (56) connected to support beam (5) in the vicinity of first journal (11) with a pivot connection (57) having a geometric axis substantially parallel to geometric axis (11A) of first journal (11). As a result, prop (56) can, for transport, be pivoted from a set down position in which prop (56) can support the support beam (5), into a position for transport and for work, in which prop (56) is retracted.

In FIG. 4, which shows mower (1) in set down position, it is also seen that locking element (28) is unlocked, i.e., that it is possible in this position to pivot hitching structure (4) relative to support beam (5) around geometric axis (11A) of first journal (11). Such an arrangement considerably facilitates the hitching of mower (1) to three points (8) of lifting device (9) of tractor (2).

Mower (1) according to the invention also comprises a traction element (58) intended to lighten cutting mechanism (6) during work. This traction element (58) extends between hitching structure (4) and cutting mechanism (6), and consists mainly of a draw spring (59) joined with a control device (60). Draw spring (59) is connected to cutting mechanism (6) by a pivot connection (61) with a geometric axis substantially parallel to geometric axis (12A) of second journal (12), and to control device (60) by a tie rod (62) having a geometric axis approximately coaxial with the longitudinal axis of said draw spring (59). Control device (60) is connected to hitching structure (4) with a pivot connection (63) with a geometric axis substantially parallel to geometric axis (11A) of first journal (11). Advantageously, in this embodiment this pivot connection (63) connecting control device (60) to hitching structure (4) and joint (51) connecting hydraulic cylinder (50) to said hitching structure (4) are substantially coaxial.

FIGS. 6 to 8 show control device (60) more clearly. The latter makes it possible to cancel the action of draw spring (59) during the setting down process, to be able to allow the pivoting of hitching structure (4) around geometric axis (11A) of first journal (11). For this purpose, control device (60) includes a retractable stop (64) movable into contact with a shoulder (65) of tie rod (62) so as to prevent further translation of the tie rod (62) beyond that shown in FIGS. 6 to 8. This stop (64) can therefore occupy two positions: a work position in which shoulder (65) of tie rod (62) rests against said stop (64), which stops movement of the tie rod due to spring force and makes it possible for draw spring (59) to lighten cutting mechanism (6); and a set down position in which said stop (64) is retracted, which makes it possible for tie rod (62) to be translated in control device (60) so as to reduce the spring force when cutting mechanism (6) extends longitudinally over the ground. Advantageously, tie rod (62) is guided in control device (60) by a cylindrical connection (66) and one of its longitudinal ends is screwed into a connecting element (67) integral with draw spring (59). Thanks to such an arrangement, the lightening force of draw spring (59) can easily be adjusted by screwing tie rod (62) more or less deeply in connecting element (67) of draw spring (59).

The putting of stop (64) into the work position is performed by a spring (68), while a remote control element (69) controls the putting of stop (64) in the set down position. As shown in FIGS. 1, 3, 4, 6, 7 and 8, stop (64) and its spring (68) are advantageously combined in a leaf spring (70) whose free end has the shape of a fork. It is also seen in several of these Figures that remote control element (69) of control device (60) is actuated together with prop (56), so that when the latter is in its work position, draw spring (59) can lighten cutting mechanism (6) and conversely when prop (56) is in its set down position, the action of draw spring (59) is cancelled. For this purpose, in this embodiment according to the invention, remote control element (69) of control device (60) comprises a cladding (71) inside of which can be translated a cable (72) connected, on the one hand, to prop (56) and, on the other hand, to stop (64) of control device (60). As a result, as soon as prop (56) is moved from its work position to its set down position, or vice versa, this has the effect of translating cable (72) in cladding (71) and of moving stop (64) toward or away from tie rod (62).

It can also be seen in FIGS. 1 to 4 that lightening structure (4) of this mower (1) according to the invention consists of a frame (73) supporting three hitching points (7) and a connecting device (74) connecting said frame (73) to first journal (11). This connecting device (74) comprises a journal (75) connected at its lower end to first journal (11) and connected to frame (73) of hitching structure (4) with a pivot connection (76) with a geometric axis which is substantially vertical. Further, at the upper end of journal (75) of connecting device (74) are attached control device (60) of traction element (58), pipe (30) of locking element (28) and a longitudinal end of hydraulic cylinder (50). Due to such an arrangement, it is possible, when the user desires it, to pivot cutting mechanism (6) and support beam (5) together to the rear around the geometric axis of pivot connection (76) of connecting device (74). For example, there is provided, between support beam (5) and frame (73) of hitching structure (4), a releasing device (77) which allows, during work, the pivoting of cutting mechanism (6) around the geometric axis of connecting device (74) when said cutting mechanism (6) encounters an obstacle that it cannot clear. Further, it could also be possible to pivot cutting mechanism (6), raised laterally in transport position, to the rear in the extension of tractor (2) around the geometric axis of pivot connection (76) of connecting device (74). Such a maneuver could reduce the transport width.

Mower (1) of FIGS. 1 to 8, which has just been described, operates in the following manner.

Mower (1) is connected to three hitching points (8) of lifting device (9) of tractor (2) by its hitching structure (4), and drive shaft with universal joints (24) is coupled to the power takeoff (not shown) of said tractor (2).

During work, cutting mechanism (6) extends in its work position, as shown in FIGS. 1 and 2. Tractor (2) moves mower (1) in a direction of advance (10) during work and its power takeoff drives in rotation disks (15) via transmission elements (24, 25, 26, 23, 22) and various drive elements housed in transmission housing (19) and cutting bar (13).

By rotating, cutting tools (16) of disks (15) cut the product to be harvested which is in the cutting zone and drums (17) grade the windrow of cut product placed behind cutting mechanism (6).

Since support beam (5) can pivot slightly around geometric axis (11A) of first journal (11) and since cutting mechanism (6) can pivot around geometric axis (12A) of second journal (12) relative to support beam (5), said cutting mechanism (6) can duly adapt to the contour of the terrain. Draw spring (59) reduces the force with which cutting mechanism (6) rests on the ground.

When it is desired to transport mower (1), the driving in rotation of disks (15) is stopped.

To place mower (1) in transport position (FIG. 3), three hitching points (8) of lifting device (9) of tractor (2) are first lifted, which has the effect of lifting mower (1) when the pivoting of support beam (5) downward around geometric axis (11A) of first journal (11) is stopped by limiter (29) of locking element (28) and pivoting lever (52) abuts against transmission housing (19) which has a support face (78) provided for this purpose. In this windrow position (not shown) where cutting mechanism (6) extends substantially horizontally above the ground, remote control element (39) is pulled, which makes catch (41) pivot counterclockwise into an unlocked position (FIG. 5). By so doing, catch (41) also drives lock (32) into a locking transport position. While maintaining the action on remote control element (39), cutting mechanism (6) is pivoted around geometric axis (12A) of second journal (12) by maneuvering element (49). Once cutting mechanism (6) is in its raised transport position, remote control element (39) is related s that catch (41) is hooked to latch element (45) of cutting mechanism (6) under the action of spring (44). Further, holding element (46) of cutting mechanism (6) compresses elastically deformable element (47) and holds lock (32) in the locking position. The transport can therefore begin.

Advantageously, cutting mechanism (6) is thus immobilized relative to hitching structure (4), which considerably limits the swinging of said cutting mechanism (6).

To set down mower (1) (FIG. 4), the user first puts set down element (55) manually in set down position. By so doing, remote control element (69) which connects set down element (55) to control device (60) retracts stop (64) by separating it from tie rod (62). As can be seen in FIG. 3, such a maneuver is made easy by the fact that during transport shoulder (65) of tie rod (62) is no longer in contact with stop (64). The user then acts on the other remote control element (39), which removes catch (41) from latch element (45) of cutting mechanism (6). The latter then is no longer locked, and the action of elastically deformable element (47) on cutting mechanism (6) is sufficient to begin the pivoting of cutting mechanism (6) around geometric axis (12A) of second journal (12) via hydraulic cylinder (50). By so doing, cutting mechanism (6) pivots to its windrow position under the action of its weight while being cushioned by the damping effect of the flow of the oil from hydraulic cylinder (50) which returns to tractor (2). As soon as cutting mechanism (6) has pivoted by a certain angle, the user releases remote control element (39), which has the effect of substantially simultaneously bringing catch (41) close to its initial position under the action of its spring (44) and lock (32) into its unlocked position under the action of the other spring (38).

The pivoting of cutting mechanism (6) downward is stopped when the rod of hydraulic cylinder (50) is entirely extended. By then lowering the three hitching points (8) of lifting device (9) of tractor (2), cutting mechanism (6) is brought into contact with the ground. By continuing to lower lifting device (9), support beam (5) pivots around geometric axis (11A) of first journal (11), which has the effect of separating pivoting lever (52) from support face (78) of transmission housing (19). The descent of support beam (5) is stopped when, in this embodiment, prop (56) rests on the ground, i.e., when pin (35) of limiter (29) is at least approximately in the center of slot (34) of rod (31). Mower (1) then rests longitudinally on the ground by cutting mechanism (6) and prop (56). Mower (1) can therefore be uncoupled from tractor (2).

When mower (1) is removed, as shown in FIG. 4, draw spring (59) is expanded and tie rod (62) can be translated in control device (60). In this position, moreover, hitching structure (4) can pivot relative to support beam (5) around geometric axis (11A) of first journal (11) within the limit allowed by limiter (29). As stated above, this substantially facilitates the subsequent hitching of mower (1) to tractor (2).

To bring mower (1) from its set down position into its transport position, the various operations will be performed in reverse; i.e., three hitching points (7) of hitching structure (4) are first connected to three hitching points (8) of lifting device (9) of tractor (2) by pivoting, if necessary, hitching structure (4) around geometric axis (11A) of first journal (11), and drive shaft with universal joints (24) is coupled to the power takeoff (not shown) of tractor (2). Then, three hitching points (8) of lifting device (9) of tractor (2) are lifted, which has the effect of lifting entire mower (1). The user then actuates remote control element (39) to lock limiter (29). While maintaining this action, maneuvering element (49) is activated to lift cutting mechanism (6) into its transport position. As soon as cutting mechanism (6) is in its raised transport position, the user releases remote control element (39) to make it possible for catch (41) to be hooked to hooking element (45) of cutting mechanism (6) under the action of spring (44). Further, holding element (46) of cutting mechanism (6) compresses elastically deformable element (47) and holds lock (32) in a locking position. It remains only to manually retract set down element (55), which, via remote control element (69), brings stop (64) near tie rod (62). The transport can then begin.

To place mower (1) in a work position, remote control element (39) of catch (41) is actuated and the oil contained in hydraulic cylinder (50) is simultaneously allowed to return to tractor (2). By so doing, cutting mechanism (6) pivots toward its windrow position. As soon as cutting mechanism (6) has pivoted by a certain angle, remote control element (39) is released, which has the simultaneous effects of bringing catch (41) at least close to its initial position under the action of its spring (44) and permitting the lock (32) to move to its unlocked position under the action of other spring (38).

The downward pivoting of cutting mechanism (6) is stopped when the rod of hydraulic cylinder (50) is entirely extended. By then lowering three hitching points (8) of lifting device (9) of tractor (2), cutting mechanism (6) is brought into contact with the ground. Lifting device (9) is continued to be lowered until limiter (29) is half-open, so that pivoting lever (52) is separated from support face (78) of transmission housing (19) and so that pin (35) of limiter (29) is at least approximately in the center of slot (34) of rod (31 . Lastly, disks (15) are driven in rotation so that the work can begin.

Figure 10:
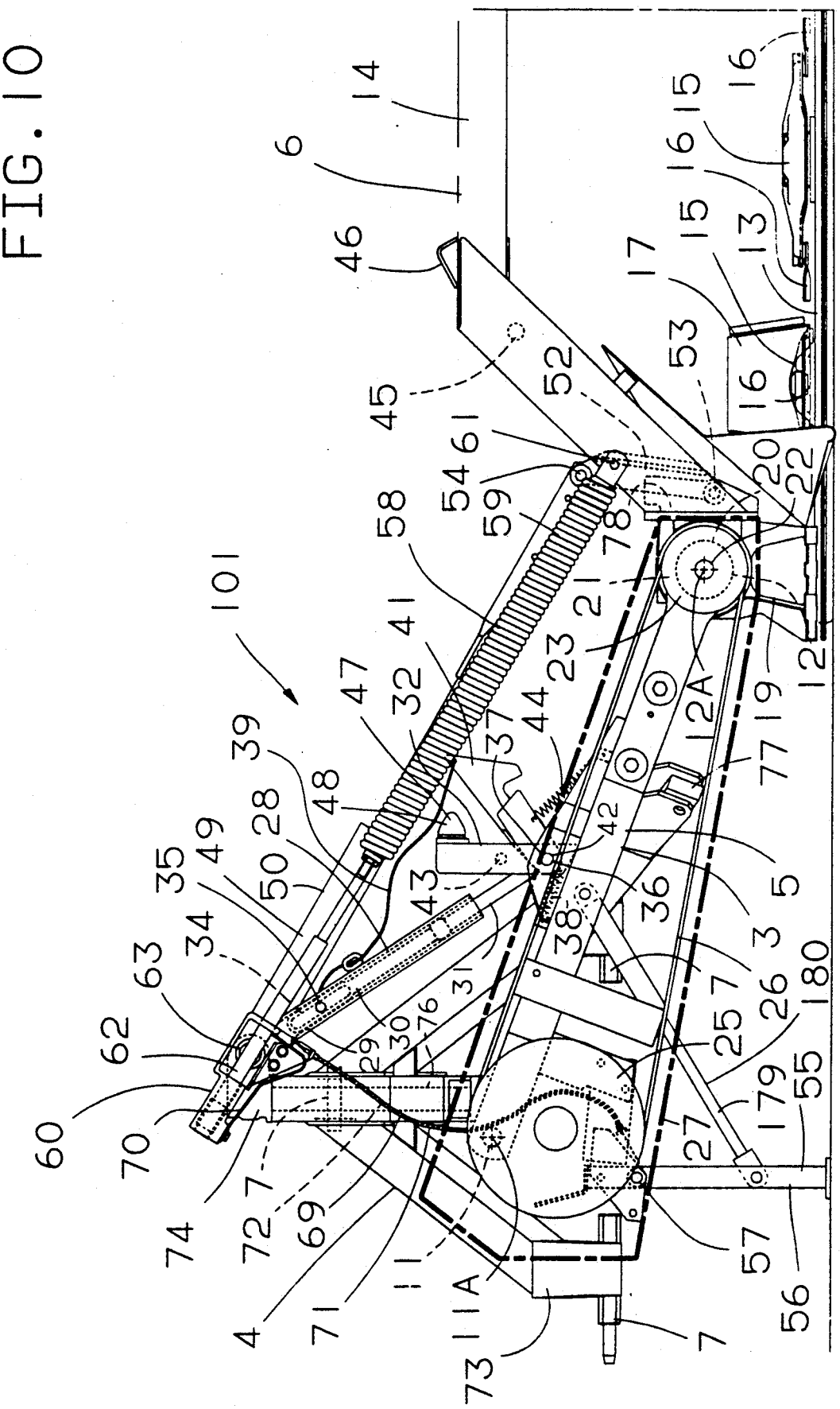
FIG. 10 shows, in set down position, the mower of FIG. 9 seen from the rear in the direction of advance during work.

FIGS. 9 and 10 show another embodiment of a mower (101) according to the invention.

This mower (101) comprises, except as noted below, all the parts of mower (1) described above; these parts will thereby not be described again. This mower (101) differs, however, from the preceding one by the inclusion of a maneuvering means (179) intended to bring set down element (55) from its retracted position into its set down position and conversely. Actually, as shown in FIGS. 9 and 10, a single-action hydraulic cylinder (180) or the equivalent extends between prop (56) and support beam (5). The user can thus actuate the corresponding distributor of the hydraulic center of tractor (2) to pivot prop (56) into the desired position by hydraulic cylinder (180).

Advantageously, in this embodiment, the user uses a remote control element for the pivoting of prop (56). This therefore prevents the tractor from descending especially for this operation. Aside from the operations of hitching and removing mower (101), the user can, in this embodiment, control the unit of mower (101) from his tractor.

It will also be understood that various modifications can be provided to the embodiments described without thereby going outside the field of protection as defined in the claims.

What is claimed as new and desired to be secured by Letters Patent of the United States is:

1. Cutting machine connectable to a motor vehicle, having a lifting device, for cutting agricultural products as the motor vehicle moves in a work direction, comprising:
   a cutting mechanism positionable to extend crosswise to the work direction;
   a hitching structure having three hitching points connectable to three hitching points of the lifting device of the motor vehicle;
   a support beam connected to the hitching structure via a first journal having a first axis directed at least approximately in the work direction and extending, as seen in the work direction, in the vicinity of a triangle formed by the three hitching points of said hitching structure, said support beam being connected to said cutting mechanism via a second journal having a second axis directed at least approximately in the working direction;
   a set down element mounted to hold said support beam in a set down position, whereby said hitching structure can pivot around said first axis of said first journal;
   a traction element comprising a draw spring for lightening said cutting mechanism;
   means for cancelling the lightening effect of said traction element for setting down of the said cutting machine;
   a locking element comprising means for locking pivoting of said support beam relative to said hitching structure around the first axis of said first journal during transport; and
   means for cancelling the locking action of said locking element during work and set down of the said cutting machine.

2. Cutting machine according to claim 1, wherein said traction element extends between said hitching structure and said cutting mechanism, and wherein further said draw spring is expanded when its action is cancelled.

3. Cutting machine according to claim 1, wherein said means for selectively cancelling the lightening effect of said traction element comprises a control device.

4. Cutting machine according to claim 3, wherein said draw spring is connected at one end thereof to said cutting mechanism via a pivot connection with an axis at least approximately parallel to the second axis of said second journal, including a tie rod connecting an other end of said draw spring to said control device and having an axis at least approximately coaxial with the longitudinal axis of said draw spring, and wherein said control device is connected to the hitching structure via a pivot connection having an axis at least approximately parallel to said first axis of said first journal.

5. Cutting machine according to claim 4, wherein said tie rod has a shoulder and said control device has a retractable stop, wherein said retractable stop is movable so as to occupy:
   a work position in which the shoulder of said tie rod rests against said stop so that said draw spring lightens said cutting mechanism; and
   a set down position in which said stop is retracted and where said cutting mechanism rests longitudinally on the ground.

6. Cutting machine according to claim 5, including a spring holding said stop in the work position.

7. Cutting machine according to claim 6, wherein said stop and said spring are comprised by a leaf spring having a free end in the shape of a fork.

8. Cutting machine according to claim 3, including a remote control element for actuating said control device.

9. Cutting machine according to claim 1, wherein said set down element is mounted adjacent said first journal so as to occupy:
- a work position in which said set down element is retracted; and
- a set down position in which said set down element is extended so as to rest on the ground to support said support beam.

10. Cutting machine according to claim 9, including a maneuvering means for moving said set down element between the work position and the set down position.

11. Cutting machine according to claim 10, wherein said maneuvering means comprise a cylinder controlled from the motor vehicle.

12. Cutting machine according to claim 9, including:
- a) a control device comprising said means for cancelling the lightening effect of said draw spring, and
- b) a remote control element for actuating said control device together with said set down element, whereby when said set down element is in the work position, said draw spring can lighten said cutting mechanism, and when said set down element is in the set down position, the effect of said draw spring is cancelled.

13. Cutting machine according to claim 12, wherein said remote control element comprises a cladded cable connected between said set down element and said control device.

14. Cutting machine according to claim 1, wherein said locking element comprises:
- a variable length limiter pivotally connected at one longitudinal end to said hitching structure and at an other longitudinal end to said support beam, each of the joints at the ends of the limiter having an axis extending at least approximately parallel to the axis of first journal; and
- a lock comprising means for locking the length of said limiter during transport.

15. Cutting machine according to claim 14, wherein: said limiter comprises a pipe connected to said hitching structure and a rod fitted in said pipe and connected to said support beam, said rod having a slot inside of said pipe and through which a pin attached to said pipe passes; and
said lock is connected to said support beam by a pivot connection with an axis at least approximately coaxial with an axis of a joint connecting said rod to said support beam, whereby said lock can occupy two positions by pivoting around the axis of said pivot connection, said two positions comprising a position for work and for setting down in which the length of the limiter is permitted to vary, and a locking position in which said limiter is locked in a fully open position with a maximum length.

16. Cutting machine according to claim 14, including a spring biasing said lock into the work and set down position.

17. Cutting machine according to claim 14, including a remote control element comprising means for bringing said lock into said transport position.

18. Cutting machine according to claim 17, wherein said remote control element comprises a rope which may be handled from the motor vehicle.

19. Cutting machine according to claim 1, including a maneuvering element comprising means for bringing said cutting mechanism into a raised transport position by pivoting around the second axis of the second journal.

20. Cutting machine according to claim 19, wherein said maneuvering element comprises a cylinder connected at one longitudinal end to said cutting mechanism via a pivoting lever and at an other longitudinal end to said hitching structure via a joint having an axis at least approximately parallel to the first axis of said first journal.

21. Cutting machine according to claim 19, including a holding element comprising means for holding said lock in the locking position when said cutting mechanism is in a raised transport position.

22. Cutting machine according to claim 21, including an elastically deformable element positioned between said holding element and said lock.

23. Cutting machine according to claim 22, wherein said elastically deformable element comprises a rubber stop attached to said lock.

24. Cutting machine according to claim 1, including locking means for locking said cutting mechanism in a raised transport position.

25. Cutting machine according to claim 24, including a remote control element comprising means for manually unlocking said cutting mechanism.

26. Cutting machine according to claim 24, wherein said locking means comprises a catch connected to the support beam via a pivot connection having an axis at least approximately to the second axis of the second journal and comprising means for hooking to a latch element of said cutting mechanism, and a spring comprising means for displacing and holding the catch in a latching position.

27. Cutting machine according to claim 1, wherein, seen in the work direction, the first axis of said first journal extends at least approximately in the center of said triangle.

28. Cutting machine according to claim 1, wherein said hitching structure comprises a frame having three hitching points and a connection device connecting said frame to said first journal, wherein said connecting device allows pivoting of said first journal relative to said frame around an upwardly directed geometric axis.

29. Cutting machine according to claim 28, wherein said connecting device comprises a journal connected at a lower end thereof to said first journal and connected to said frame via a pivot connection with a geometric axis at least approximately vertical.

* * * * *